April 9, 1935. A. W. ROBISON 1,997,083
PROCESS OF PRODUCING FOODSTUFFS
Filed May 7, 1932
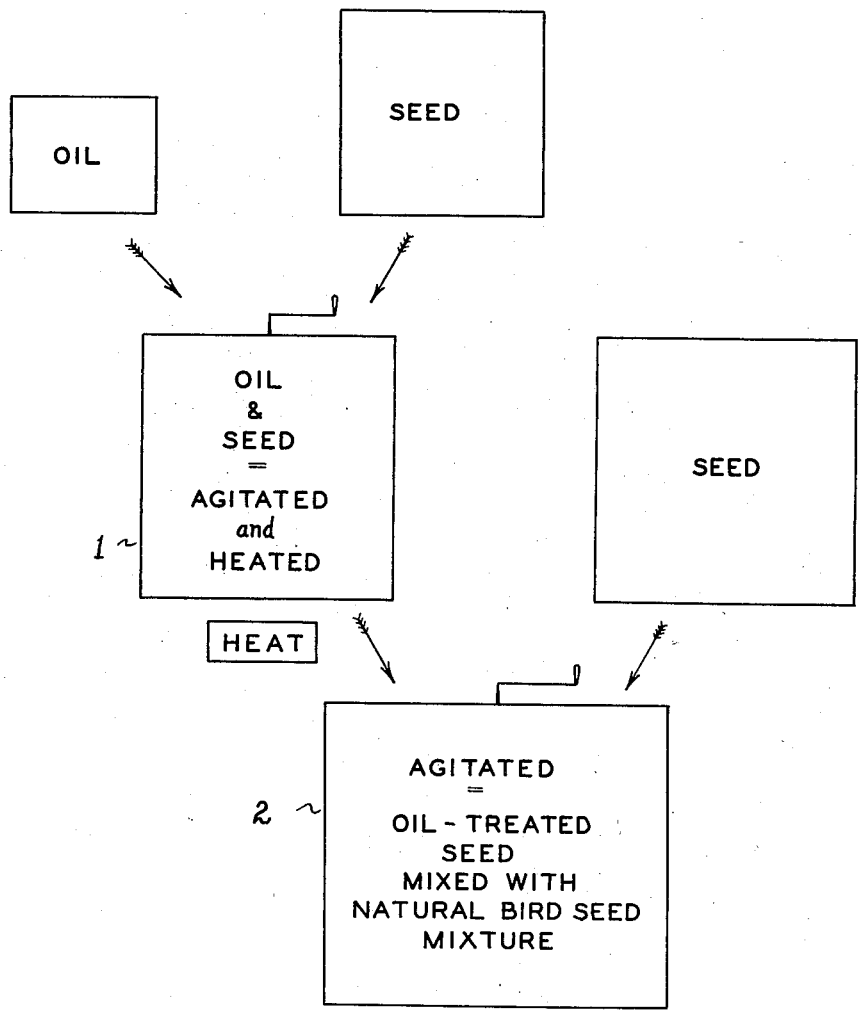
INVENTOR.
ANSEL W. ROBISON.
BY
ATTORNEY.

UNITED STATES PATENT OFFICE 1,997,083

PROCESS OF PRODUCING FOODSTUFFS

Ansel W. Robison, San Mateo, Calif.

Application May 7, 1932, Serial No. 609,907

2 Claims. (Cl. 99—11)

This invention relates to improvements in food stuffs and the process of producing the same, and more particularly to impregnated bird seed.

The invention will be described in connection with the process of treating "bird seed"; but the teaching will guide those skilled in the art in processing other cereals and cereal products to impregnate them with the desired additional food elements which is one of the objects of the invention.

The principal object of the invention is to enrich the seed by the addition of fats and vitamins, especially vitamin D.

A further object is to improve the product by absorbing loose dust particles, deleterious to the health of birds.

Other objects and advantages will appear as the description progresses.

In this specification and the accompanying diagram, the invention will be disclosed in its preferred form. It is to be understood, however, that it is not limited to this form, because it may be embodied in other forms within the purview of the claims following the description.

The one sheet of drawing diagrammatically discloses the various steps in the process, without limiting it as to the apparatus to be used.

There are various mixtures of bird seed to meet the requirements of certain species of birds, or their physical condition.

A few conventional mixtures are as follows:

Example A

| | |
|---|---|
| Canary seed | 3 pounds |
| German rape seed | 1 pound |

Example B

| | |
|---|---|
| Canary seed | 5 pounds |
| Common yellow millet | 5 pounds |
| California rape seed | 2 pounds |
| Red millet | 1 pound |

Example C (Love birds)

| | |
|---|---|
| Canary seed | 40 pounds |
| Common millet | 20 pounds |
| Steel cut oats | 3 pounds |
| Red millet | 3 pounds |
| Oat groat | 3 pounds |

Example D (Special diet seed)

| | |
|---|---|
| Steel cut oats | 40 pounds |
| Canary seed | 20 pounds |
| German rape seed | 17 pounds |
| Poppy seed | 2 pounds |
| Thistle seed | 2 pounds |
| Lettuce seed | 1½ pounds |
| Poultry pepper | ½ pound |
| Saffron | 2 ounces |

These constituents are mixed dry and proportioned by weight. The above Examples A, B, C, D are for so-called hard billed birds.

There are other species classified as soft bill birds, for which mashes and soft mixtures are preferable, to which oil processed seeds may be added.

These seed mixtures are treated with oils carrying a high percentage of vitamins. Experience has proved that so-called cod liver oil, cod liver oil concentrates, and other refined fish oils, are rich in vitamin D, which is especially valuable in bird food.

A suitable fish oil extracted from the bodies of California sardines has a specific gravity of about .93, with a low content of free fatty acid, about .5%. The relatively heavy body of this oil is reduced by the heat applied until it flows freely. The preferred proportion is to add to any of the above seed mixtures about one-eighth of one per cent of this oil, by weight.

For example, referring to the diagram, into the receptacle 1, place forty-eight (48) pounds of seed mixture, such as A, followed by the oil, and heat to a temperature of about sixty or seventy degrees (60°–70°) centigrade, for about ten minutes.

It is important to constantly stir the mixture in the receptacle 1, to diffuse the heat evenly, prevent scorching the seed and to evenly distribute the oil, so that each seed accumulates a coating film of oil.

Where heating and roasting ovens are available the process can be made continuous. If small batches are desired the mixing and heating can be carried on in buckets or pans and the stirring done manually with paddles.

After mixing and heating the seed and oil as described, it is set aside to cool and absorb for two or three days. The batch of 48 pounds of treated seed, containing about 4⅞ ounces of oil thus seasoned, is added to nine hundred and twelve (912) pounds of natural seed at room temperature, in the receptacle 2, wherein the oil processed seed and the natural seed are thoroughly mixed and intermingled. The total batch now weighs nine hundred and sixty (960) pounds more or less. The oil in the processed seed equals about one eighth (⅛) of one percent (1%) by weight, of the total seed batch of 960 pounds.

It is good practice to oil treat only the hard canary seed, then add them to the desired mixture, thus avoiding the heating of the rape and other soft seed.

This finished seed can then be packed into cans, bags, cartons or other packages in the conventional manner.

The quality of the seed and the oil will vary and the proportions may be changed accordingly, but the above is representative of average conditions.

The following is a laboratory report:

Bird seed

One lot of seed consisting of canary seed, 3 parts, and German rape seed, 1 part, was treated with oil. Twelve pounds of the seed mixture was heated for about ten minutes at a temperature of 60° to 70° C. (140° to 158° F.) and treated with 4⅞ ounces of oil.

After heating and treating with oil, the mixture weighed 12 pounds, 1 ounce.

Samples were taken for examination at our laboratory of the oil, the seed before heating, the seed after heating, and the seed after treating with oil. Samples of red label bird seed (Example A) and blue label canary mixture (Example B) which had been mixed with oil about three weeks previously were also taken for rancidity tests.

Laboratory tests

Microscopic examinations were made of thin sections of the seeds both before and after treatment with the oil. No very definite information could be obtained by this method as to whether the oil had penetrated the seed hull to any extent. But washing the seeds with ether and evaporating and weighing the ether washing gives very definite information.

Ether washings from seeds treated with oil one day previously amounted to 1.23% after allowing for the natural oil washed from untreated seeds.

Washings from seeds treated with oil five days previously amounted to .85%.

Ether washings from seeds treated with oil three weeks previously amounted to .23%.

Since the oil added to the batch of seeds was 2.50% weight, the oil absorbed by the seeds in one day and not merely sticking to the outside was 2.50 minus 1.23 or 1.27%.

Similarly the oil absorbed in 5 days was 1.65% and the oil absorbed in 3 weeks was 2.27%.

In other words, about half the oil is absorbed in the seeds in one day—about two-thirds is absorbed in five days and about nine-tenths is absorbed in three weeks.

The heat applied in oil processing the seeds causes them to "pop" slightly, just enough to crack the hard shell without materially altering the kernel to facilitate absorption of the oil by the kernels of the seeds.

This heat also reduces the viscosity of the oil to a point where capillary attraction insures the uniform distribution of a very thin film of oil on each seed, nearly all of which is eventually absorbed, as stated.

Bird seeds, in their natural state, after harvesting, contain field dust and must be cleaned by winnowing. The better grades are recleaned before packing, and even then contain considerable dust. Such dust is not especially dangerous to the digestion of birds, but the loose dust sets up pulmonary irritations which are deleterious to songsters.

This dust is entirely absent from seed mixtures containing these oil processed seeds. In the process of mixing, some oil is transferred to the surfaces of the untreated seeds, and the oil film absorbs the dust. Since the birds do not consume these outer seed shells, the dust is rendered harmless. This is among the primary advantages and the use of suitable oil in cleaning seed is claimed as part of this invention.

Obviously medicinal ingredients can be introduced into the oil before combining with the seeds, for the benefit of the bird or to delay rancidity of the oil. However, care must be exercised in this, not to endanger the delicate vitamins in the oil. The vitality of the bird, built up by feed containing this oil processed seed, is the best "medicine".

There are many forms of animal and vegetable fatty oils, such as olive oil, cotton and other seed oils, that may be used in processing seeds in accordance with this invention, but the fish oils are at present preferred for bird feed. Care must be used in selection of vegetable oils, as many of them have laxative and other effects.

Having thus described this invention, what is claimed and desired to secure by Letters Patent is:

1. The process of dry treating bird seeds in the class described in bulk and with the natural shells thereon, consisting of adding a food oil to the mass; stirring the mixture; and dry heating it to a temperature just sufficient to crack said shells.

2. The process of dry treating bird seeds in the class described in bulk and with the natural shells thereon, consisting of adding food oil rich in vitamin D to the mass just sufficient to thinly coat said shells; stirring the mixture and heating it to a temperature just sufficient to crack said shells.

ANSEL W. ROBISON.